May 14, 1968  S. A. MOSIER  3,383,048
COMBUSTION GAS TRANSFER SYSTEM FOR ROCKETS
Filed Nov. 27, 1964  2 Sheets-Sheet 1
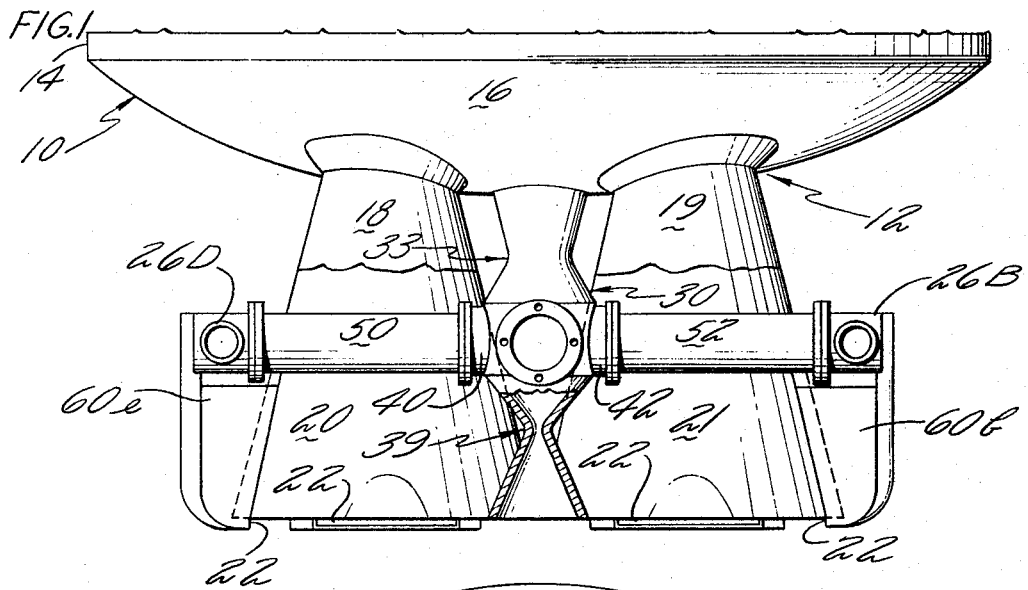
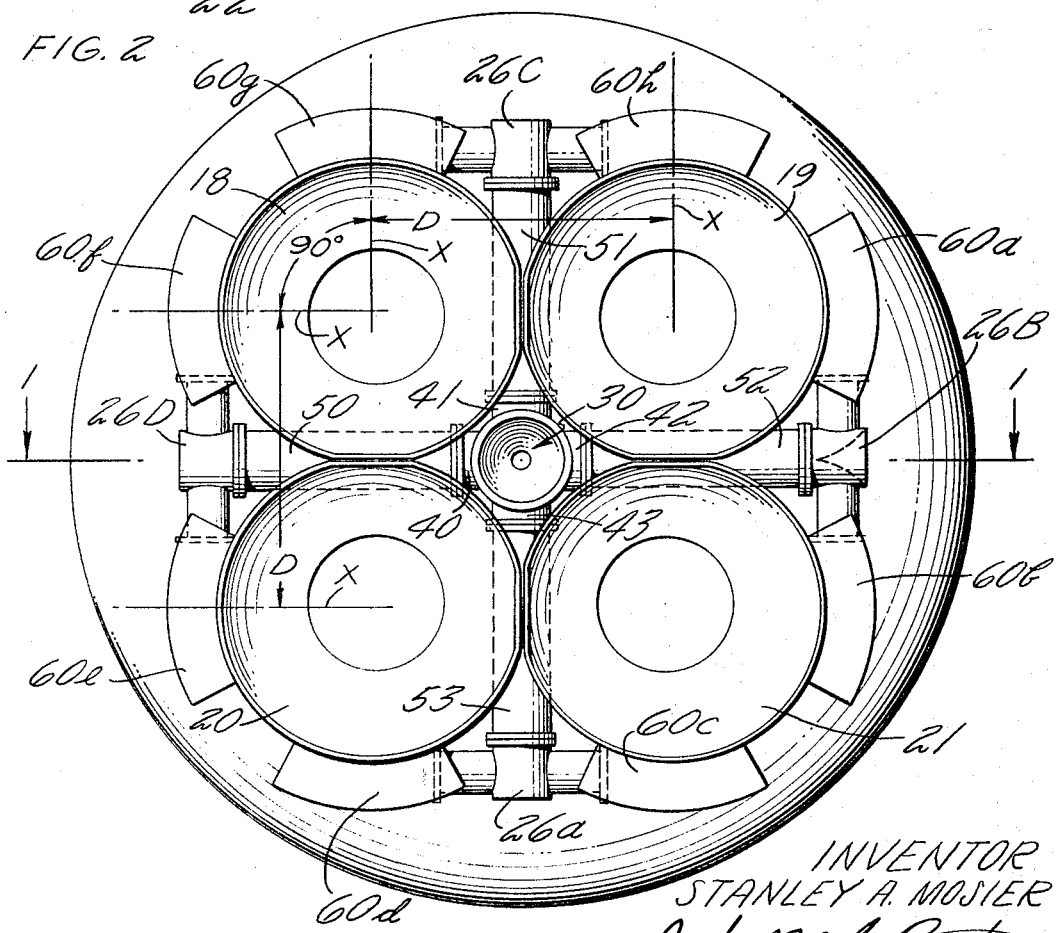
INVENTOR
STANLEY A. MOSIER
BY Jack N. McCarthy
AGENT May 14, 1968 S. A. MOSIER 3,383,048
COMBUSTION GAS TRANSFER SYSTEM FOR ROCKETS
Filed Nov. 27, 1964 2 Sheets-Sheet 2

INVENTOR
STANLEY A. MOSIER
BY
AGENT

United States Patent Office 3,383,048
Patented May 14, 1968

3,383,048
COMBUSTION GAS TRANSFER SYSTEM
FOR ROCKETS
Stanley A. Mosier, North Palm Beach, Fla., assignor to United Aircraft Corporation, East Hartford, Conn., a corporation of Delaware
Filed Nov. 27, 1964, Ser. No. 414,944
10 Claims. (Cl. 239—265.23)

ABSTRACT OF THE DISCLOSURE

An apparatus for obtaining a hot gas supply from an engine exhaust formed of a gas-solid mixture for thrust vector control wherein the hot gas has been rid of all or a great majority of the solid particles therein. An additional thrust nozzle is positioned along with regular exhaust nozzles which provides the means for separating the solid particles and providing a source of gas for use in vectoring control.

---

This invention relates to a hot gas transfer system to be used for decontaminating and directing a hot combustion gas to hot gas valves.

An object of this invention is to provide means for obtaining a hot gas supply from an engine exhaust formed of a gas-solid mixture for thrust vector control wherein the hot gas has been rid of all or a great majority of solid particles located therein.

Another object of this invention is to provide an additional thrust nozzle wherein particle momentum is conserved yet means are provided for building up a hot gas source free of the particles.

A further object of this invention is to provide a rocket vehicle with a plurality of regular exhaust nozzles with a smaller nozzle being located at the center thereof having outlets for directing a hot gas to hot gas valves and thereon to injection ports which will direct a flow of gas across the open end of the thrust nozzles to provide for vectoring control. The use of directing a gas stream into a gas flow at the end of a single nozzle is shown to be old by U. S. application Ser. No. 238,421, now Patent No. 3,212,259 to Charles Edward Kepler for Tertiary Flow Injection Vectoring System.

Another object of this invention is to provide means for obtaining uncontaminated hot gas for use with hot gas valves so that there will be no need for cumbersome erosion-resistant liners.

A further object of this invention is to provide means for passing particles in a gas desired to be used for thrust vector control in a direct line with the main thrust vector, thus conserving particle momentum.

Another object of this invention is to provide a chamber as a source of essentially uncontaminated hot gas with a primary particle accelerator providing an inlet to the chamber and a secondary particle accelerator forming a nozzle providing an outlet from said chamber. Said primary particle accelerator increasing the momentum of solid particles and directing them from its outlet into the inlet of the secondary particle accelerator or nozzle from which they are directed externally of the engine.

Other objects and advantages will be apparent from the specification and claims and from the accompanying drawings which illustrate an embodiment of the invention.

FIGURE 1 is a side view of the lower portion of a rocket casing with a nozzle arrangement attached thereto shown partially in section;

FIGURE 2 is a bottom view of the rocket casing and nozzle arrangement;

Figure 4:
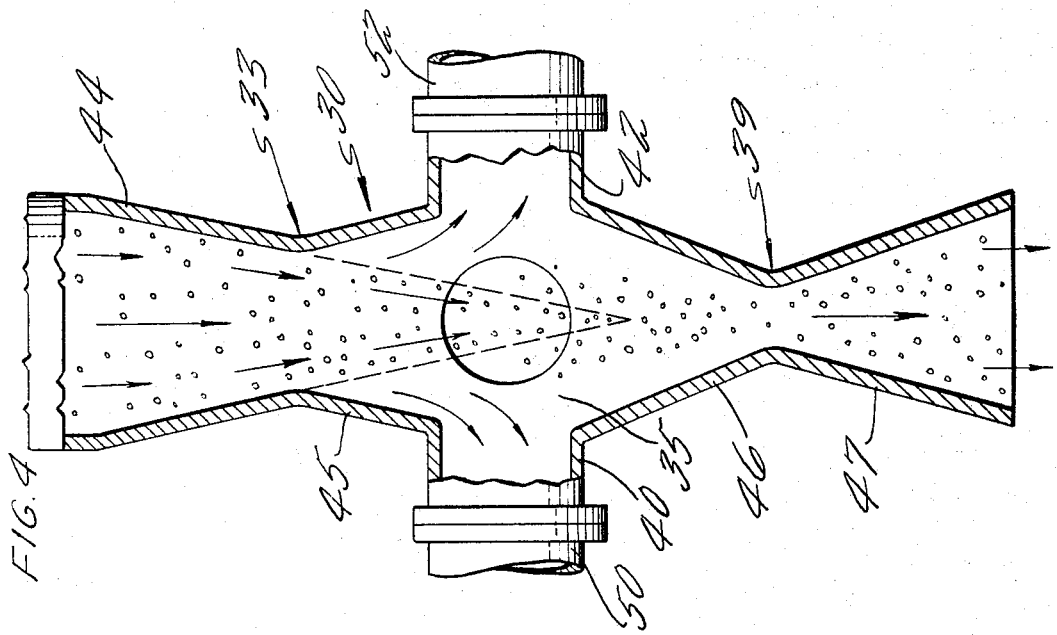
FIGURE 4 is an enlarged cross-sectional view of the center separator nozzle arrangement.

Referring to FIGURE 1, a solid propellant rocket motor is shown at 10 having a nozzle arrangement 12 attached to the lower dome-shaped end 16 of housing or casing 14. Nozzle arrangement 12 comprises four main thrust nozzles 18, 19, 20 and 21 attached to the dome-shaped end 16 with their outlets directed downwardly in a symmetric fashion. As shown, they are located in a square. A smaller separator nozzle arrangement 30 is located symmetrically in the center of nozzles 18, 19, 20 and 21 and has its outlet directed downwardly in the same manner. Nozzle arrangement 30 is also connected to the dome-shaped end 16 and receives combustion gases from within casing 14 of rocket motor 10.

The separator nozzle arrangement 30 has a primary particle accelerator 33, a separator chamber 35, and a secondary particle accelerator or nozzle 39. The primary particle accelerator 33 is formed having a converging section 44 and a diverging section 45. The opening of the converging section 44 is connected to the dome-shaped end 16 as mentioned hereinbefore. The free end of the diverging section 45 is connected to a chamber 35 providing an inlet thereto.

Chamber 35 is formed having four radially extending conduit sections 40, 41, 42 and 43 projecting therefrom. The end of each of these sections is formed having a flange at its free end for ease of attachment. The separator nozzle arrangement 30 has its secondary particle accelerator 39 formed having a converging section 46 and a diverging section 47. The free end of the converging section 46 is attached to the chamber 35 with the axis of the secondary particle accelerator 39 in line with the axis of the primary particle accelerator 33. The diverging section 47 of the secondary particle accelerating section 39 has its outlet opening externally of the system.

The converging section 44 of the primary particle accelerator 33 has its sides converging symmetrically so that an extension thereof would converge at a point within the converging section 46 of the secondary particle accelerator 39. This construction gives direction to the solid particles passing through the separator, while increasing their momentum, so that essentially uncontaminated gas will flow from conduits 40, 41, 42 and 43. The interior of the accelerators can be coated with tungsten or pyrolytic graphite for erosion resistance.

Conduit sections 40, 41, 42 and 43 are each directed radially between pairs of adjacent main nozzles 20, 18; 18, 19; 19, 21; and 21, 20. Each conduit section 40, 41, 42 and 43 has an extending conduit 50, 51, 52 and 53, respectively. Each extending conduit is formed having a flange at both ends for ease of attachment. Each extending conduit has its flange fixedly mounted to the flange of its cooperating conduit section extending from the chamber 35. These extending conduits extend between the pairs of adjacent main nozzles with an outlet located further radially outwardly for a purpose to be hereinafter described.

Figure 3:
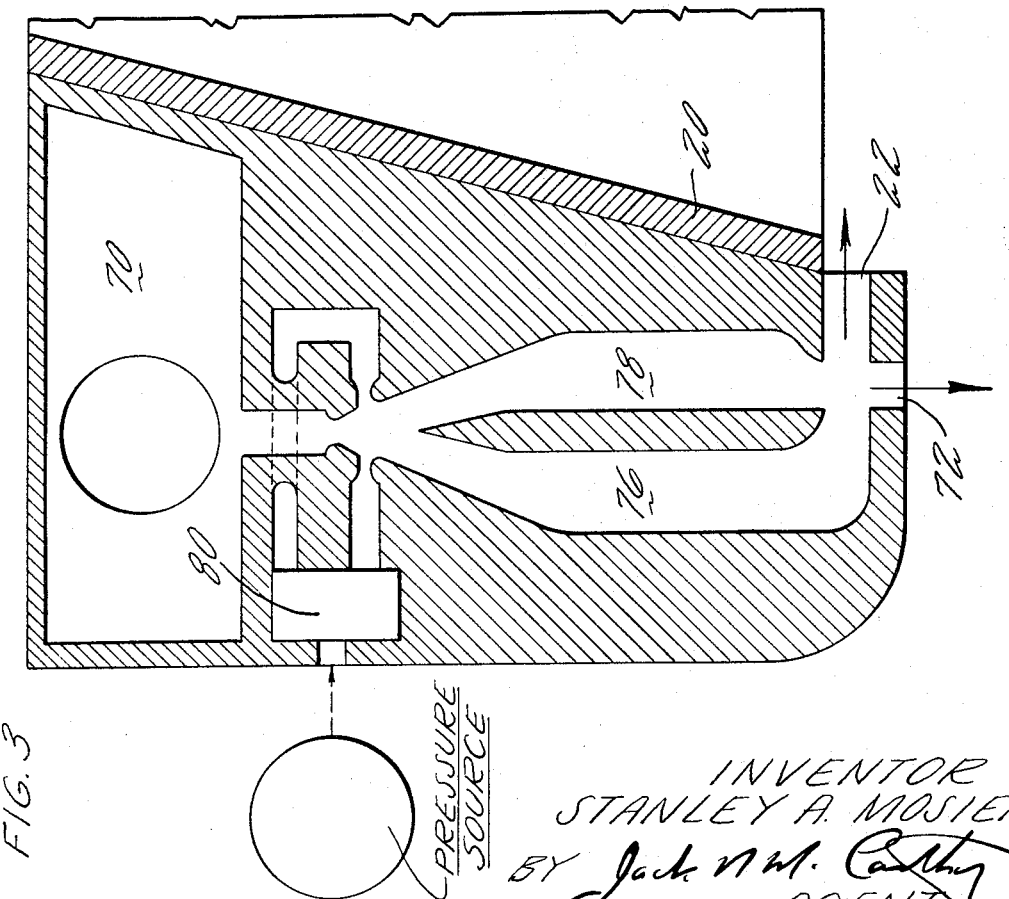
FIGURE 3 is a sectional view of a deflector unit.

Each main nozzle 18, 19, 20 and 21 has two deflector units 60 positioned adjacent its sides thereof and each deflector unit has a chamber 70 for receiving a gas (see FIG. 3). Each deflector unit 60 has an inlet positioned on its side adjacent the free end of the cooperating extending conduit.

A flow-splitting unit 26 is positioned between adjacent inlets of the deflector units. Each flow-splitting unit 26 has two outlets and one inlet each ending in a flange. These flow-splitting units can be provided with a vane means as shown by dotted lines in 26B. The flange at the outlet of each extending conduit is connected to the flange of an inlet of its cooperating flow-splitting unit 26. The flange of one outlet of a flow-splitting unit 26 is connected to the adjacent inlet of one cooperating deflector unit 60 and the flange of the other outlet of the flow-splitting unit is connected to the other adjacent inlet of its other cooperating deflector unit 60.

The deflector units 60 located on each of the main nozzles have their center lines X located at an angle of 90° apart from a reference center line of each nozzle. The center lines X of adjacent attached deflector units 60 are spaced apart a like distance D.

While each deflector unit 60 is shown having a bistable fluid valve arrangement therein between chamber 70 and the exit of its cooperating nozzle, a monostable valve could be used. In FIG. 3, nozzle 20 is shown.

The valving arrangement set forth in FIGURE 3 is known as a bistable fluid valve and, as shown, is similar in cross section to the valve shown in U.S. Patent No. 3,135,291. Flow through branch passageways 76 and 78 to nozzles 22 and 72, respectively, is controlled by an actuator 80. A high pressure fluid is connected to the actuator to provide the actuating fluid. While a fluid type actuator for switching is shown, other means can be used such as a tab. With this arrangement, it can be seen that thrust parallel to the main nozzle thrust is obtained from the nozzles 72 which are used when no thrust vectoring is required. Flow through a nozzle or slot 22 directs a flow of fluid across the cooperating main nozzle flow providing for thrust vectoring.

It is to be understood that the invention is not limited to the specific description above or other specific figures, but may be used in other ways without departure from its spirit as defined by the following claims.

I claim:

1. In combination in a rocket engine, a casing, a nozzle arrangement attached to said casing, said nozzle arrangement having a plurality of main nozzles symmetrically arranged, each nozzle having a deflector unit attached thereto for ejecting a gas in line with the flow through the nozzle or across the flow through said nozzle during vectoring operation, a chamber located between the plurality of main nozzles, said chamber being positioned so as to receive a gas-solid mixture from said casing, an auxiliary nozzle extending from said chamber in the same direction as the main nozzles, the throat of said auxiliary nozzle being restricted so as to permit particles in a gas-solid mixture passing through said chamber to also pass through said nozzle, said throat also building up a hot gas pressure in the chamber, and conduit means connecting said chamber to each of said deflector units.

2. In combination in a rocket engine, a casing, a nozzle arrangement attached to said casing, said nozzle arrangement having a plurality of main nozzles symmetrically arranged, each nozzle having deflector means attached thereto for ejecting a gas in line with the flow through the nozzle or across the flow through said nozzle, each deflector means having an inlet, a chamber located between the plurality of main nozzles, said chamber being positioned so as to receive gas-solid mixtures from said casing, an auxiliary nozzle extending from said chamber in the same direction as the main nozzles, the throat of said auxiliary nozzle being restricted so as to permit particles in a gas-solid mixture passing through said chamber to also pass through said nozzle, said throat also building up a hot gas pressure in the chamber, and a conduit connecting said chamber to the inlet of each of said deflector means.

3. In combination in a rocket engine, a casing, a nozzle arrangement attached to said casing, said nozzle arrangement having a plurality of main nozzles symmetrically arranged, each nozzle having deflector means attached thereto for ejecting a gas in line with the flow through the nozzle or across the flow through said nozzle, each deflector means having an inlet, a chamber located between the plurality of main nozzles, a primary particle accelerator connecting the interior of said casing to said chamber, an auxiliary nozzle extending from said chamber in the same direction as the main nozzles, the throat of said auxiliary nozzle being restricted so as to permit particles in a gas-solid mixture passing through said chamber to also pass through said auxiliary nozzle, said throat also building up a hot gas pressure in the chamber, and a conduit connecting said chamber to the inlet of each of said deflector means.

4. In combination in a rocket engine, a casing, a nozzle arrangement attached to said casing, said nozzle arrangement having a plurality of main nozzles symmetrically arranged, each nozzle having deflector means attached thereto for ejecting a gas in line with the flow through the nozzle or across the flow through said nozzle, each deflector means having an inlet, a chamber located between the plurality of main nozzles, a primary particle accelerator connecting the interior of said casing to said chamber, a secondary particle accelerator extending from said chamber in the same direction as the main nozzles, the throat of said secondary particle accelerator being restricted so as to permit particles in a gas-solid mixture passing through said chamber to also pass through said secondary particle accelerator, said throat also building up a hot gas pressure in the chamber, and a conduit connecting said chamber to the inlet of each of said deflector means.

5. In combination in a rocket engine, a casing, a nozzle arrangement attached to said casing, said nozzle arrangement having four main nozzles symmetrically arranged in a square, each nozzle having two deflector units attached thereto for ejecting a gas across the flow through said nozzle, each deflector unit having an inlet, a chamber located between the plurality of main nozzles, said chamber being positioned so as to receive a gas-solid mixture from said casing, an auxiliary nozzle extending from said chamber in the same direction as the main nozzles, the throat of said auxiliary nozzle being restricted so as to permit particles in a gas-solid mixture passing through said chamber to also pass through said nozzle, said throat also building up a hot gas pressure in the chamber, and a connecting conduit connected to said chamber and extending between each pair of nozzles, means connecting the free end of each connecting conduit to adjacent deflector units of each pair of nozzles.

6. In combination in a rocket engine, a casing, a nozzle arrangement attached to said casing, said nozzle arrangement having four main nozzles symmetrically arranged in a square, each nozzle having two deflector units attached thereto for ejecting a gas across the flow through said nozzle, each deflector unit having an inlet, a chamber located between the plurality of main nozzles, said chamber being positioned so as to receive a gas-solid mixture from said casing, a nozzle extending from said chamber in the same direction as the main nozzles, the throat of said nozzle being restricted so as to permit particles in a gas-solid mixture passing through said chamber to also pass through said nozzle, said throat also building up a hot gas pressure in the chamber, and a connecting conduit connected to said chamber and extending between each pair of nozzles, means connecting the free end of each connecting conduit to adjacent deflector units of each pair of nozzles, each connecting means including a flow-splitter.

7. In combination in a rocket engine, a casing, a nozzle arrangement attached to said casing, said nozzle arrangement having a plurality of main nozzles symmetrically arranged, each nozzle having a deflector unit attached thereto for ejecting a gas in line with the flow through said nozzle or across the flow through said nozzle, each deflector unit having an inlet, a chamber located between the plurality of main nozzles, a primary particle accelerator connecting the interior of said casing to said chamber, said primary particle accelerator comprising a converging section and a diverging section forming a restriction, said converging section having an inlet connected to the interior of said casing, said diverging section having an outlet connected to said chamber, a nozzle extending from said chamber in the same direction as the main nozzles, the throat of said nozzle being restricted so as to permit particles in a gas-solid mixture passing through said chamber to also pass through said nozzle, said throat also building up a hot gas pressure in the chamber, and a conduit connecting said chamber to the inlet of each of said deflector means.

8. In combination in a rocket engine, a casing, a nozzle arrangement attached to said casing, said nozzle arrangement having a plurality of main nozzles symmetrically arranged, each nozzle having a deflector unit attached thereto for ejecting a gas in line with the flow through said nozzle or across the flow through said nozzle, each deflector unit having an inlet, a chamber located between the plurality of main nozzles, a primary particle accelerator connecting the interior of said casing to said chamber, said primary particle accelerator comprising a converging section and a diverging section forming a restriction, said converging section having an inlet connected to the interior of said casing, said diverging section having an outlet connected to said chamber, a secondary particle accelerator comprising a second converging section and a second diverging section forming a restriction, said converging section having an inlet connected to said chamber, said diverging section having an outlet extending in the same direction as the main nozzles, the restriction formed by said primary particle accelerator being larger than the restriction formed by the secondary particle accelerator, the converging portion of said primary particle accelerator having its sides sloped at an angle so that an extension of the converging portion intersects at a point within the inlet to the converging portion of the secondary particle accelerator, the restriction of said secondary particle accelerator being sized so as to permit particles in a gas-solid mixture passing through said chamber to also pass through said secondary particle accelerator, said restriction also building up a hot gas pressure in the chamber, and a conduit connecting said chamber to the inlet of each of said deflector means.

9. In combination, an apparatus as set forth in claim 2 wherein each conduit connecting said chamber to the inlet of each of said deflector units extends from said chamber at an angle of approximately 90°.

10. In combination, an apparatus as set forth in claim 4 wherein the throat of said primary accelerator is restricted so as to direct particles in a gas-solid mixture into the secondary particle accelerator.

References Cited
UNITED STATES PATENTS 3,255,971   6/1966   Widell _____ 239—265.23

M. HENSON WOOD, Jr., *Primary Examiner.*

SAMUEL FEINBERG, *Examiner.*

V. M. WIGMAN, *Assistant Examiner.*